Dec. 15, 1959   R. H. CHAMPION ET AL   2,917,124
VEHICLE BODY EXHAUST PORT CLOSURE
Filed Jan. 18, 1956   3 Sheets-Sheet 1

INVENTORS
Joseph H. Gilson &
BY Richard H. Champion
Paul Fitzpatrick
ATTORNEY

Dec. 15, 1959   R. H. CHAMPION ET AL   2,917,124
VEHICLE BODY EXHAUST PORT CLOSURE
Filed Jan. 18, 1956   3 Sheets-Sheet 2

INVENTORS
Joseph H. Gilson &
BY Richard H. Champion
Paul Fitzpatrick
ATTORNEY

Dec. 15, 1959    R. H. CHAMPION ET AL    2,917,124
VEHICLE BODY EXHAUST PORT CLOSURE
Filed Jan. 18, 1956    3 Sheets-Sheet 3

INVENTORS
Joseph H. Gilson &
BY Richard H. Champion
Paul Fitzpatrick
ATTORNEY

United States Patent Office 2,917,124
Patented Dec. 15, 1959

2,917,124
VEHICLE BODY EXHAUST PORT CLOSURE

Richard H. Champion, Birmingham, and Joseph H. Gilson, Warren, Mich., assignors to General Motors Corporation, Detroit, Mich., a corporation of Delaware Application January 18, 1956, Serial No. 559,824

4 Claims. (Cl. 180—64)

This invention relates to vehicle body closures and more particularly to a vehicle body exhaust port closure and the operating mechanism thereof.

The exhaust port closure of this invention, in its preferred embodiment, includes a pair of closure doors which are swingably mounted on the body for movement to open and closed positions with respect to a body exhaust port. The doors are resiliently biased to closed position and are power actuated to open position with a latch being provided to hold the doors in open position. The latch is automatically movable to latched position to hold the doors in open position and is power actuated to unlatch position to allow the doors to be closed. Both the power actuating means for the doors and for the latch are automatically controlled by the vehicle ignition switch to insure that the doors are opened when the power plant is started and are closed when the power plant is shut down. The operator also need not leave the vehicle to either open or close the exhaust port doors.

The primary object of this invention is to provide a new and improved vehicle body closure and operating mechanism therefor. Another object of this invention is to provide a new and improved vehicle body exhaust port closure and operating mechanism therefor. A further object of this invention is to provide a vehicle body exhaust port closure which is movable to open and closed positions and which is operable from within the body. Yet another object of this invention is to provide a vehicle body exhaust port closure movable to open and closed positions and which is automatically controlled by the operator from within the body through the vehicle ignition switch.

These and other objects of this invention will be readily apparent from the following specification and drawings, wherein.

Figure 1:
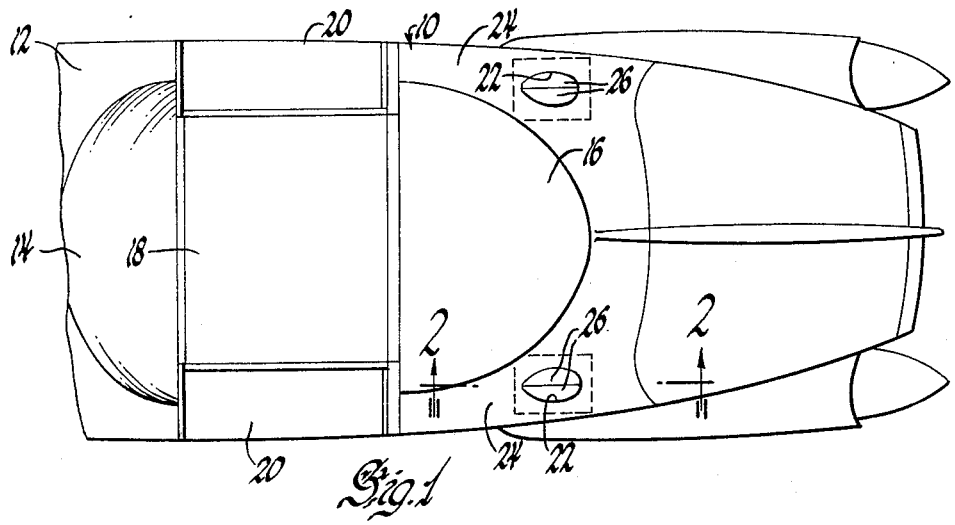
Figure 1 is a top plan view of a vehicle body embodying a closure according to this invention.

Referring now to Figure 1 of the drawings, a vehicle body 10 includes a hood 12, a windshield 14, a backlite 16, a roof panel 18 secured to the windshield and the backlite, and a canopy door 20 on either side of the body which is supported by the roof panel 18 and forms an upper door section. A power plant (not shown) is supported by the body beneath hood 12 and the exhaust from the power plant is discharged through an opening 22 on either side of the body in the rear quarter panel 24 thereof. Each opening 22 is closed by a pair of closure doors 26 which are movable from a closed position, as shown in Figure 1, when the power plant is not running to an open position when the power plant is running to allow the exhaust from the power plant to escape to the atmosphere through openings 22. Since each pair of closure doors is of the same construction and is operated in the same manner, only the left hand pair of closure doors will be particularly described. It will be understood, of course, that the right hand pair of closure doors is of the same construction and is simultaneously operated with the one pair of closure doors which is described.

Figure 2:
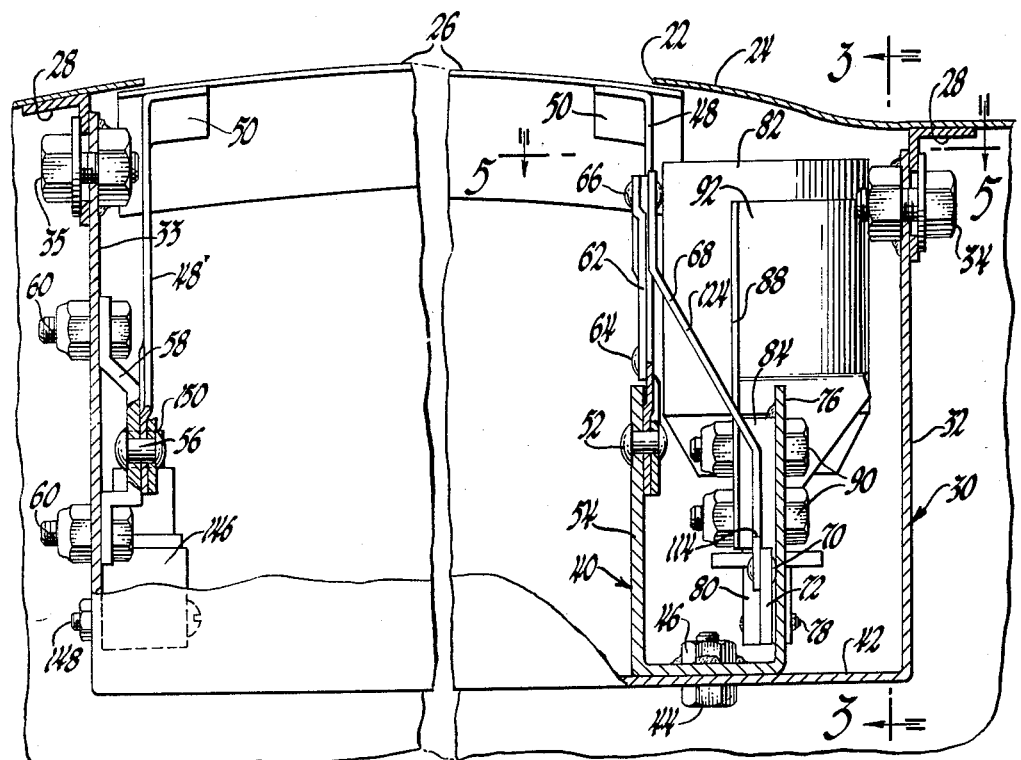
Figure 2 is a sectional view taken on the plane indicated by line 2—2 of Figure 1.
Figure 3:
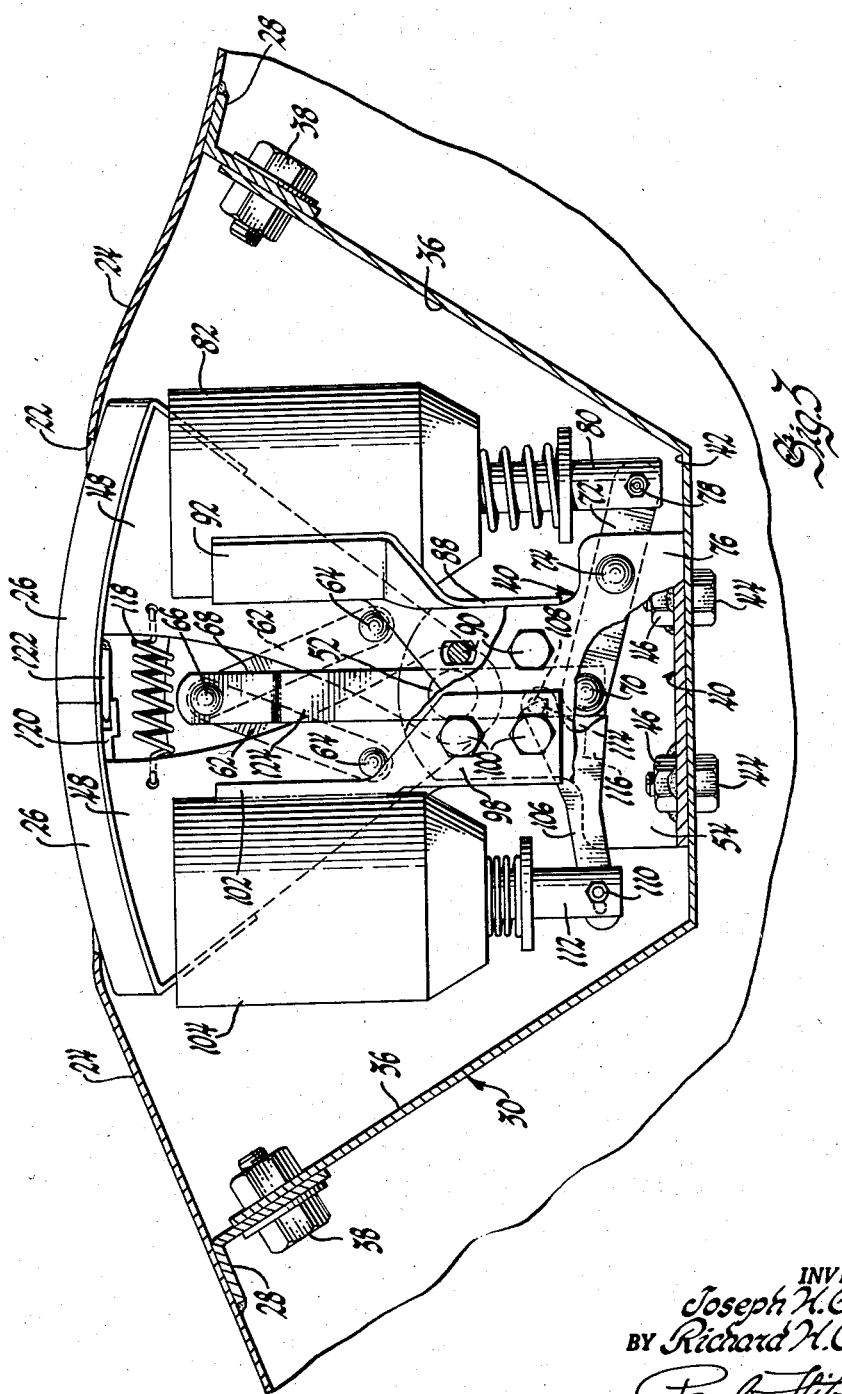
Figure 3 is a sectional view taken on the plane indicated by line 3—3 of Figure 2 showing the closure in closed position with parts broken away for clarity of illustration.
Figure 5:
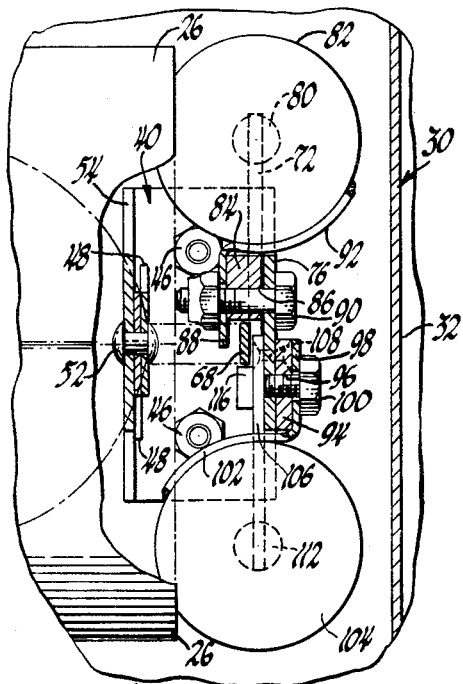
Figure 5 is a partial top plan view taken on the plane indicated by line 5—5 of Figure 2.

Referring now to Figures 2, 3 and 5 of the drawings, a rectangularly shaped mounting ring 28 is welded or otherwise secured to the rear quarter panel 24 around the opening 22 therein. A housing 30, which is basket-shaped as can be seen in Figure 3, has its end walls 32 and 33 secured to the mounting ring at 34 and 35, respectively, and its side walls 36 secured to the mounting ring at 38. A U-shaped bracket 40 is mounted on the base wall 42 of housing 30 by means of bolts 44 which are threaded into nuts 46 welded to the base of the bracket. Leg members 48 and 48' at opposite sides of the closure doors 26 have a flange 50 which is welded to the undersurface of the door. One pair of leg members 48 at one side of the doors is pivotally mounted at 52 on leg 54 of bracket 40, and the other pair of leg members 48' at the other side of the doors is pivotally mounted at 56 on an offset bracket 58 which is bolted at 60 to the end wall 33 of housing 30. Pivots 52 and 56 are aligned so that each door is swingable about a common axis which extends longitudinally of the doors.

A pair of offset links 62 have one end thereof pivotally secured at 64 to each leg member 48 and the other end thereof pivotally secured at 66 to an offset shiftable link 68. The free end of link 68 is pivotally secured at 70 to a swingable lever 72 which is pivoted at 74 on leg 76 of bracket 40. The free end of lever 72 is pivotally secured at 78 within the bifurcated end portion of the armature 80 of an opening solenoid 82. A plate 84 is welded to the inner surface of leg 76 of bracket 40 and is provided with apertures 86 which are aligned with similar apertures in leg 76. A bracket 88 is bolted at 90 to plate 84 and leg 76 of bracket 40 and includes an arcuate portion 92 which is welded or otherwise secured to the opening solenoid 82 so as to rigidly mount the solenoid on bracket 40.

A plate 94 is welded or otherwise secured to the outer surface of leg 76 of bracket 40 and includes apertures 96 which are aligned with similar apertures in leg 76 of the bracket. A bracket 98 is bolted at 100 to plate 94 and leg 76 of bracket 40 and includes an arcuate portion 102 which is welded or otherwise secured to a solenoid 104. A latch member 106 is pivotally secured at one end thereof at 108 to leg 76 of bracket 40 and the other end of the latch member is pivotally secured at 110 within the bifurcated end portion of armature 112 of solenoid 104.

Figure 4:
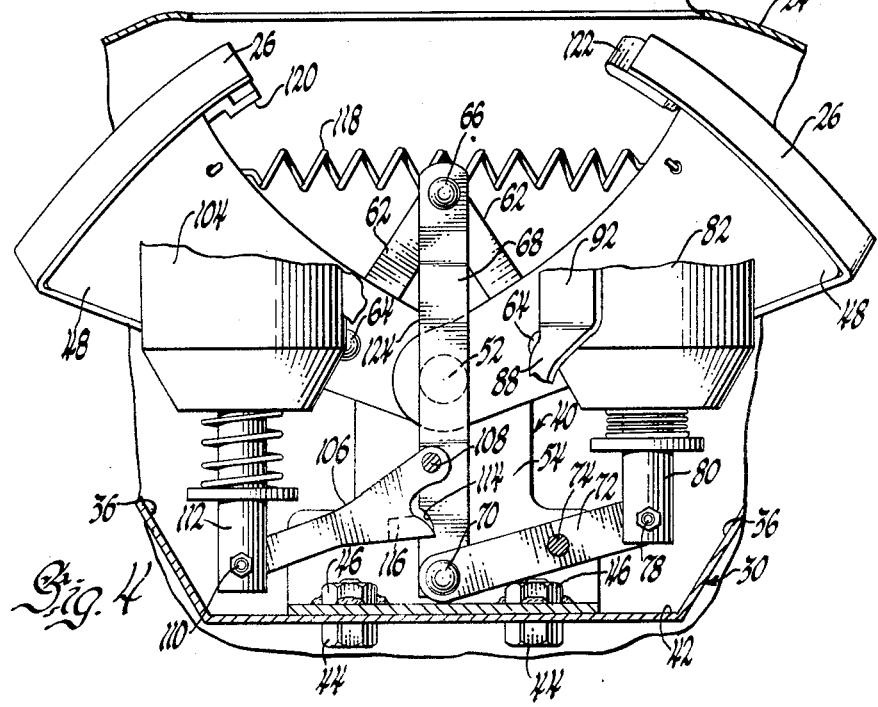
Figure 4 is a view similar to Figure 3 showing the closure in open position with parts broken away for clarity of illustration.

The shiftable link 68 is provided with a notch 114, and a lug 116 which is welded or otherwise secured to latch member 106 is adapted to fit within notch 114 in the open position of the doors, as shown in Figure 4, to hold the doors in this position. In the closed position of the doors, as shown in Figure 3, lug 116 bears against an edge 124 of link 68. A tension spring 118 extends between leg members 48 at one side of the doors to bias the doors to closed position. As shown particularly in Figures 3 and 4, one of the doors may be provided with an offset bracket 120 adjacent one end thereof and the other door may be provided with a tongue 122 which is adapted to be received within the offset portion of bracket 120 in the closed position of the doors to align the mating edges of the doors and to insure that the doors thereby continue the contour of the adjacent surface of the rear quarter panel 24.

The doors are shown in closed position in Figure 3 and in open position in Figure 4. Although not shown in the drawings, an exhaust pipe or tube extends through the base wall 42 of housing 30 and terminates slightly short of opening 22 so that in the open position of the doors the exhaust pipe will discharge to the atmosphere.

Referring now particularly to Figures 3 and 4, the operation of the closure doors will be described. In the closed position of the doors, as shown in Figure 3, links 62 are substantially folded and the shiftable link 68 is in its upper terminal position. The lug 116 of latch member 106 bears against the edge 124 of link 68, and the doors are held in closed position by the tension spring 118. If it is desired to move the doors to open position, solenoid 82 is momentarily energized to retract the solenoid armature 80 and swing lever 72 counterclockwise about pivot 74. This will shift link 68 downwardly from its upper terminal position, shown in Figure 3, to its lower terminal position shown in Figure 4. As the link shifts downwardly, it will operate to partially unfold links 62 and thereby move doors 26 to open position. Lug 116 of the latch member 106 rides along edge 124 of link 68 as the link is shifted downwardly until the lug drops within notch 114 of the link to hold the link in its lower terminal position against the action of the tension spring 118. Thus, the latch member 106 operates to hold the doors in open position against the action of the return spring since solenoid 82 is only momentarily energized to shift link 68 downwardly to its lower terminal position.

If it is desired to move doors 26 to their closed position, solenoid 104 is momentarily energized to retract the solenoid armature 112 and swing latch member 106 clockwise about its pivot 108 on bracket 40 to unlatched position. This will move lug 116 of the latch member outwardly from within notch 114 in link 68 and spring 118 will then operate to move the doors to their closed position as links 62 are partially folded and link 68 is shifted upwardly to its upper terminal position. Solenoid 104 need only be momentarily actuated to move the latch member to unlatched position. Once the doors begin to move to closed position, notch 114 in link 68 is moved out of alignment with lug 116 and the lug merely rides along the edge 124 of the link as the link moves to its upper terminal position as shown in Figure 3.

Figure 6:
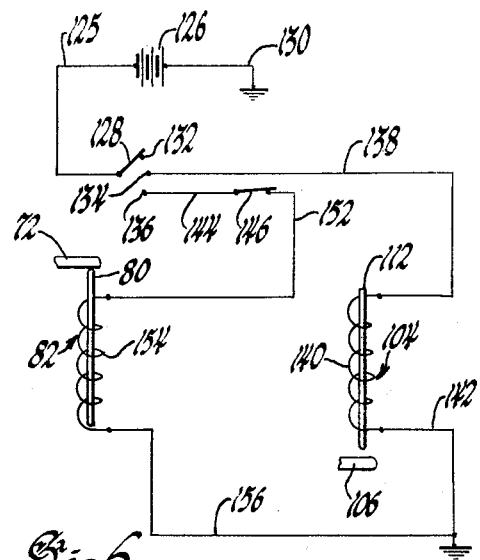
Figure 6 is a circuit diagram.

Figure 6 is a circuit diagram illustrating the operation of the doors. The doors are controlled by the operator from within the vehicle through the vehicle ignition switch. A conductor 125 extends from battery 126 to the vehicle ignition switch 128. Battery 126 is grounded through conductor 130. Ignition switch 128 has three positions, an "off" position wherein the switch arm engages contact 132, an "intermediate" position wherein the switch arm engages contacts 134, and an "on" position wherein the switch arm engages contact 136. The switch arm is moved continuously from contact 132 to contact 136 and likewise from contact 136 to 132 so that the switch arm only momentarily engages contact 134 as the switch is moved between "off" and "on" positions. A conductor 138 extends from contact 134 to the coil 140 of armature 104 and the coil is grounded through a conductor 142.

A conductor 144 extends from contact 136 to a normally closed limit switch 146. Referring now particularly to Figure 2 of the drawings, the normally closed limit switch 146 is secured at 148 to the end wall 33 of housing 30 and the switch contact 150 of the switch is adapted to be engaged by one of the leg members 48' when the doors 26 move to open position to open the switch. A conductor 152 extends from the normally closed limit switch to the coil 154 of armature 82 and a conductor 156 extends from the coil of the armature to conductor 142 which is grounded as previously described.

When the vehicle power plant is start, the ignition switch arm is moved from contact 132 to contact 136. During this movement of the ignition switch arm a circuit will be momentarily completed through the coil 140 of solenoid 104 to ground as the ignition switch arm engages contact 134. This will momentarily energize solenoid 140 to retract the latch member 106. However, since the latch member engages the edge 124 of link 68 in the closed position of doors 26, lug 116 will merely be momentarily moved away from the edge 124 and then returned into engagement therewith. When the ignition switch arm engages contact 136 a circuit is completed through coil 154 of armature 82 and through the normally closed limit switch 146 to ground to energize the solenoid and move the doors to open position as previously described. When the doors move to open position one of the leg members 48' will open switch 146 to deenergize solenoid 82. When the power plant is shut down, the ignition switch arm is moved from contact 136 to contact 132. As the switch arm moves between these contacts, it will momentarily engage contact 134 to energize the coil 140 of armature 104 and retract the latch member 106 as previously described so that the spring 118 interconnecting the doors will move the doors to closed position.

Thus, this invention provides a new and improved exhaust port closure for vehicle bodies which is operable from within the body to open and close the exhaust port opening. The operation of the exhaust port doors is controlled by the ignition switch to insure that the doors will be open when the power plant is started and to also insure that the doors will be closed when the power plant is shut down.

We claim:

1. Closure means for a vehicle body having a power plant and a body panel provided with an exhaust opening therein for power plant exhaust gases comprising, a pair of closure doors swingably mounted on said body for movement about a common pivotal axis between open and closed positions with respect to said opening, a toggle linkage operatively interconnecting said doors for coordinating movement thereof, a shiftable member pivotally connected to the pivot joint of said toggle linkage and movable between first and second terminal positions for folding and unfolding movement of said linkage to move said doors between said positions thereof, a lever swingably mounted on said body and pivotally secured to said shiftable member, first motor means operatively connected to said lever for swinging movement thereof to thereby shift said member to one of said terminal positions thereof to move said doors to one of said positions thereof, latch means automatically engageable with said shiftable member upon movement thereof to said one of said positions to thereby hold said doors in said one of said positions thereof, second motor means for releasing said latch means, means operatively secured to said doors and biasing said doors to the other of said positions thereof upon release of said latch means, ignition switch means movable to off and on positions for controlling the condition of operability of the vehicle power plant, and control means operatively interconnecting said first and second motor means with said ignition switch means for sequentially energizing said first and second motor means upon movement of said ignition switch means between off and on positions.

2. Closure means for a vehicle body having a power plant and a body panel provided with an exhaust opening therein for power plant exhaust gases comprising, a pair of closure doors swingably mounted on said body for movement about a common pivotal axis between open and closed positions with respect to said opening, a toggle linkage operatively interconnecting said doors for coordinating movement thereof, a shiftable member pivotally connected adjacent one end thereof to the pivot joint of said linkage and movable between first and second terminal positions for folding and unfolding movement of said linkage to move said doors between said positions thereof, a lever swingably mounted on said body and pivotally secured to said shiftable member adjacent the other end thereof, first motor means operatively connected to said lever for swinging movement thereof to thereby shift said member to one of said terminal positions thereof to move said doors to open position, latch means automatically engageable with said shiftable member upon movement thereof to said one of said positions to thereby hold said doors in said closed position thereof, second motor means for releasing said latch means, means operatively secured to said doors and biasing said doors to the closed position thereof upon release of said latch means to move said member to the other of said positions thereof, ignition switch means movable to off and on positions for controlling the condition of operability of the vehicle power plant, and control means interconnecting said ignition switch means and said first and second motor means for energizing said first and second motor means upon movement of said ignition switch means to off and on positions whereby said doors are moved to an open position upon movement of said ignition switch means to said on position and are moved to a closed position by said biasing means upon movement of said ignition switch means to said off position to energize said second motor means.

3. Closure means for a vehicle body having a power plant and a body panel provided with an exhaust opening therein for power plant exhaust gases comprising, a pair of closure doors swingably mounted on said body for movement about a common pivotal axis between open and closed positions with respect to said opening, a toggle linkage operatively interconnecting said doors for coordinating movement thereof, a shiftable member pivotally connected to the pivot joint of said linkage and movable between first and second terminal positions for folding and unfolding movement of said linkage to move said doors between said positions thereof, a lever swingably mounted on said body and pivotally secured to said shiftable member, first motor means operatively connected to said lever for swinging movement thereof to thereby shift said member to one of said terminal positions thereof to move said doors to open position, a latch lever swingably mounted on said body and including a latch dog, a latch dog receiving recess on said member adapted to be aligned with said dog when said member is in said one of said positions thereof, means resiliently biasing said latch lever in one direction to move said dog into engagement with said recess to hold said member in said one of said positions thereof and hold said doors in the closed position thereof, second motor means for swinging said latch lever in the other direction to release said member, means operatively secured to said doors and biasing said doors to the closed position thereof upon release of said latch dog, ignition switch means movable to off and on positions for controlling the condition of operability of the vehicle power plant, and control circuit means interconnecting the ignition switch means and said first and second motor means for energizing said first motor means upon movement of said ignition switch means to on position and for energizing said second motor means upon movement of said ignition switch means to off position.

4. Closure means for a vehicle body having a power plant and a body panel provided with an exhaust opening therein for power plant exhaust gases comprising, a pair of closure doors swingably mounted on said body for movement about a common pivotal axis between open and closed positions with respect to said opening, a toggle linkage operatively interconnecting said doors for coordinating movement thereof, a shiftable member pivotally connected to the pivot joint of said linkage and movable between first and second terminal positions for folding and unfolding movement of said linkage to move said doors between said positions thereof, a lever swingably mounted on said body and pivotally secured to said shiftable member, first motor means operatively connected to said lever for swinging movement thereof to thereby shift said member to said one of said terminal positions thereof to move said doors to open position, a latch lever swingably mounted on said body and including a latch dog, a latch dog receiving recess on said member adapted to be aligned with said dog when said member is in said one of said positions thereof, means resiliently biasing said latch lever in one direction to move said dog into engagement with said recess to hold said member in said one of said positions thereof and hold said doors in said open position thereof, second motor means for swinging said latch lever in the other direction to release said member, a spring operatively secured to said doors and biasing said doors to the closed position thereof upon release of said latch dog, ignition switch means movable to off and on positions for controlling the condition of operability of the vehicle power plant, and control circuit means interconnecting the ignition switch and said first and second motor means for energizing said first motor means upon movement of said ignition switch means to on position and for energizing said second motor means upon movement of said ignition switch means to off position.

References Cited in the file of this patent

UNITED STATES PATENTS

| | | |
|---|---|---|
| 1,792,514 | Spear | Feb. 17, 1931 |
| 1,998,990 | Hasselbaum | Apr. 23, 1935 |
| 2,035,895 | Kelly | Mar. 31, 1936 |
| 2,194,782 | Baade | Mar. 26, 1940 |
| 2,350,102 | Fairbanks | May 30, 1944 |
| 2,535,600 | Rappl | Dec. 26, 1950 |
| 2,629,569 | Andrews | Feb. 24, 1953 |
| 2,636,648 | Richardson | Apr. 28, 1953 |
| 2,708,825 | Neary | May 24, 1955 |
| 2,800,324 | Coe | July 23, 1957 |

FOREIGN PATENTS

| | | |
|---|---|---|
| 2,544 | Great Britain | of 1854 |
| 442,305 | Great Britain | Feb. 6, 1936 |